(12) United States Patent
Ma et al.

(10) Patent No.: US 11,385,732 B2
(45) Date of Patent: Jul. 12, 2022

(54) ARRAY SUBSTRATE, MANUFACTURING METHOD THEREOF, TOUCH DISPLAY PANEL AND TOUCH DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Mingchao Ma, Beijing (CN); Jun Fan, Beijing (CN); Fuqiang Li, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 565 days.

(21) Appl. No.: 16/338,288

(22) PCT Filed: Oct. 24, 2018

(86) PCT No.: PCT/CN2018/111586
§ 371 (c)(1),
(2) Date: Mar. 29, 2019

(87) PCT Pub. No.: WO2019/137062
PCT Pub. Date: Jul. 18, 2019

(65) Prior Publication Data
US 2021/0325988 A1 Oct. 21, 2021

(30) Foreign Application Priority Data
Jan. 11, 2018 (CN) .......................... 201810026777.3

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
None
See application file for complete search history.

(56) References Cited

U.S. PATENT DOCUMENTS

2013/0162570 A1* 6/2013 Shin ...................... G06F 3/0412
345/173
2016/0291760 A1 10/2016 CHAI et al.
(Continued)

FOREIGN PATENT DOCUMENTS

| CN | 103529584 A | 1/2014 |
| CN | 104698709 A | 6/2015 |

(Continued)

OTHER PUBLICATIONS

International Search Report and Written Opinion of the International Searching Authority (with English language translation of Written Opinion), International Application No. PCT/CN2018/111586, Jan. 30, 2019, 13 pp.
(Continued)

*Primary Examiner* — Brian M Butcher
(74) *Attorney, Agent, or Firm* — Myers Bigel, P.A.

(57) ABSTRACT

The present disclosure relates to the field of touch display technologies, and provides an array substrate, a manufacturing method thereof, a touch display panel and a touch display device. The array substrate includes a base substrate, and a plurality of thin film transistors, an insulating planarization layer, a plurality of pixel electrodes, a plurality of touch electrodes and a plurality of common electrodes formed sequentially on the base substrate. The insulating planarization layer has a plurality of vias exposing a drain of each thin film transistor respectively. Each pixel electrode is connected to a drain of a corresponding thin film transistor (Continued)

through a via in the insulating planarization layer, and each common electrode is connected to a corresponding touch electrode.

18 Claims, 5 Drawing Sheets

(56) References Cited

U.S. PATENT DOCUMENTS

2016/0328058 A1* 11/2016 Peng .................. H01L 27/1248
2016/0351552 A1* 12/2016 Takahashi ............... G06F 3/047
2017/0045984 A1    2/2017 Lu et al.
2017/0168614 A1    6/2017 Wei et al.
2017/0293384 A1   10/2017 Ryu et al.
2019/0056829 A1*  2/2019 Ye ...................... H01L 51/5206

FOREIGN PATENT DOCUMENTS

| CN | 104716144 A   | 6/2015  |
| CN | 104777692 A   | 7/2015  |
| CN | 205427390 U   | 3/2016  |
| CN | 106775108 A   | 5/2017  |
| CN | 106842663 A   | 6/2017  |
| CN | 107170749 A   | 9/2017  |
| CN | 108062915 A   | 5/2018  |
| KR | 20170115630 A | 10/2017 |

OTHER PUBLICATIONS

First Office Action and English language translation, CN Application No. 201810026777.3 Mar. 20, 2019, 18 pp.

* cited by examiner

ARRAY SUBSTRATE, MANUFACTURING METHOD THEREOF, TOUCH DISPLAY PANEL AND TOUCH DISPLAY DEVICE

CROSS REFERENCE TO RELATED APPLICATIONS

The present application is a 35 U.S.C. 371 national stage application of PCT International Application No. PCT/CN2018/111586, filed on Oct. 24, 2018, which claims the benefit of Chinese Patent Application No. 201810026777.3 filed on Jan. 11, 2018, the contents of which are incorporated herein by reference in their entireties.

TECHNICAL FIELD

The present disclosure relates to the field of touch display technology, and in particular to an array substrate, a manufacturing method thereof, a touch display panel and a touch display device.

BACKGROUND

The touch display device is a device that can realize both display and touch. Currently, a touch display device generally comprises a touch display panel, and the touch display panel generally comprises a display panel and a touch panel. According to the relative positional relationship between the touch panel and the display panel, the touch display panel can be classified into a built-in touch display panel and an out-cell touch display panel. Specifically, the built-in touch display panel can be further classified into an in-cell touch display panel (also referred to as an embedded touch display panel) and an on-cell touch display panel. The in-cell touch display panel has been widely researched and applied for its convenience in manufacturing thin and light products.

An in-cell touch display panel in the related art generally comprises an array substrate, wherein the array substrate generally comprises: a base substrate, and thin film transistors, touch electrodes, a common electrode and pixel electrodes formed sequentially on the base substrate. Additionally, the touch electrodes are connected to the corresponding common electrode, and the pixel electrodes are connected to drains of the corresponding thin film transistors. In addition, an insulating planarization layer is formed between the thin film transistors and the touch electrodes. During operation of the touch display panel provided with the above array substrate, for example, during the display phase, the thin film transistors are turned on and provide pixel voltage signals to the pixel electrodes; at the same time, the touch electrodes provide a common voltage signal to the common electrode, thereby generating voltage differences between the pixel electrodes and the common electrode to realize display function of the touch display panel. In contrast, during the touch phase, the touch electrodes provide touch voltage signals to the common electrode, so that the common electrode experiences a voltage change after the touch is sensed, thereby realizing touch of the touch display panel.

In the above array substrate, the pixel electrode is located at a side of the common electrode facing away from the thin film transistors. Therefore, during operation of the touch display panel provided with the above array substrate, in particular, during the display phase, a large capacitance is easily generated between the common electrode and an electrode (for example, a source) of the thin film transistor. Therefore, in order to achieve a good display effect of the touch display panel, it is generally required to increase the common voltage signal applied to the common electrode, which will cause an increase in power consumption when the touch display panel operates. Meanwhile, in the above array substrate, the touch electrode is formed on the insulating planarization layer. Currently, the touch electrode is generally made of a metal material, and the touch electrode is usually formed by a sputtering process. Furthermore, the insulating planarization layer is typically made of an organic material. In such a case, when the metal touch electrode is formed by a sputtering process, the insulating planarization layer will easily be decomposed in the sputtering chamber having a high temperature, thereby causing contamination to the sputtering chamber.

SUMMARY

According to an aspect of the present disclosure, an array substrate is provided. The array substrate comprises: a base substrate; a plurality of thin film transistors in an array on the base substrate; an insulating planarization layer, the insulating planarization layer being located at a side of the plurality of thin film transistors away from the base substrate and having a plurality of vias exposing a drain of each thin film transistor respectively; a plurality of pixel electrodes in an array on a side of the insulating planarization layer away from the plurality of thin film transistors, each pixel electrode being connected to a drain of a corresponding thin film transistor through a via in the insulating planarization layer; a plurality of touch electrodes in an array on a side of the plurality of pixel electrodes away from the insulating planarization layer; and a plurality of common electrodes in an array on a side of the plurality of touch electrodes away from the plurality of pixel electrodes, each common electrode being connected to a corresponding touch electrode.

According to a specific implementation, in the array substrate provided by an embodiment of the present disclosure, the insulating planarization layer comprises a single layer having a thickness greater than or equal to 6 µm.

According to a specific implementation, in the array substrate provided by an embodiment of the present disclosure, the insulating planarization layer comprises a plurality of sub-layers, and a total thickness of the plurality of sub-layers is greater than or equal to 6 µm.

According to a specific implementation, in the array substrate provided by an embodiment of the present disclosure, the insulating planarization layer comprises a first sub-layer adjacent to the plurality of thin film transistors and a second sub-layer away from the plurality of thin film transistors. A thickness of the first sub-layer is greater than or equal to 4 µm, and a thickness of the second sub-layer is between 2 µm and 4 µm.

According to a specific implementation, in the array substrate provided by an embodiment of the present disclosure, the insulating planarization layer is made of an acrylic material.

According to a specific implementation, the array substrate provided by an embodiment of the present disclosure further comprises: a plurality of data lines on the base substrate, wherein a source of each thin film transistor is connected to a corresponding data line; and an orthographic projection of each touch electrode on the base substrate at least partially overlaps with an orthographic projection of a corresponding data line on the base substrate.

According to a specific implementation, in the array substrate provided by an embodiment of the present disclosure, each common electrode comprises a first portion and a second portion, an orthographic projection of the first portion on the base substrate at least partially overlaps with an orthographic projection of a corresponding touch electrode on the base substrate, an orthographic projection of the second portion on the base substrate does not overlap with an orthographic projection of a corresponding touch electrode on the base substrate, and the common electrode is connected to a corresponding touch electrode through the first portion.

According to a specific implementation, the array substrate provided by an embodiment of the present disclosure further comprises: a first dielectric layer between the plurality of pixel electrodes and the plurality of touch electrodes, and a second dielectric layer between the plurality of touch electrodes and the plurality of common electrodes, wherein an orthographic projection of the second dielectric layer on the base substrate does not overlap with an orthographic projection of the plurality of pixel electrodes on the base substrate.

According to a specific implementation, in the array substrate provided by an embodiment of the present disclosure, the first dielectric layer is made of an inorganic material, and the second dielectric layer is made of an organic material or an inorganic material.

According to a specific implementation, in the array substrate provided by an embodiment of the present disclosure, each of the thin film transistors comprises a low temperature polysilicon thin film transistor.

According to another aspect of the present disclosure, a touch display panel is also provided. The touch display panel comprises the array substrate as described in any of the above embodiments.

According to yet another aspect of the present disclosure, a touch display device is also provided. The touch display device comprises the touch display panel as described in any of the above embodiments.

According to still another aspect of the present disclosure, a manufacturing method for an array substrate is also provided. The manufacturing method comprises the following steps: providing a base substrate (S1); forming a plurality of thin film transistors in an array on the base substrate (S2); forming an insulating planarization layer on a side of the plurality of thin film transistors away from the base substrate and forming a plurality of vias exposing a drain of each thin film transistor respectively in the insulating planarization layer (S3); forming a plurality of pixel electrodes in an array on a side of the insulating planarization layer away from the plurality of thin film transistors (S4), each pixel electrode being connected to a drain of a corresponding thin film transistor through a via in the insulating planarization layer; forming a plurality of touch electrodes in an array on a side of the plurality of pixel electrodes away from the insulating planarization layer (S5); and forming a plurality of common electrodes in an array on a side of the plurality of touch electrodes away from the plurality of pixel electrodes (S6), each common electrode being connected to a corresponding touch electrode.

According to a specific implementation, in the manufacturing method for an array substrate provided by an embodiment of the present disclosure, the step of forming the insulating planarization layer on a side of the plurality of thin film transistors away from the base substrate and forming the plurality of vias in the insulating planarization layer comprises the following sub-steps: depositing a layer of insulating planarization material on a side of the plurality of thin film transistors away from the base substrate (S31); forming the plurality of vias in the layer of insulating planarization material (S32); and repeating the above two sub-steps, such that the plurality of vias in each layer of insulating planarization material formed thereafter is in intercommunication with the corresponding vias in each layer of insulating planarization material formed previously (S33).

According to a specific implementation, the manufacturing method for an array substrate provided by an embodiment of the present disclosure further comprises the following steps: after forming the plurality of pixel electrodes and before forming the plurality of touch electrodes, forming a first dielectric layer on a side of the plurality of pixel electrode away from the insulating planarization layer; and after forming the plurality of touch electrodes and before forming the plurality of common electrodes, forming a second dielectric layer on a side of the plurality of touch electrodes away from the plurality of pixel electrodes, and forming a plurality of vias in the second dielectric layer, such that each via corresponds to one touch electrode.

BRIEF DESCRIPTION OF THE DRAWINGS

The drawings described herein are merely provided to give a further understanding of the present disclosure and constitute a part of the present disclosure. Illustrative embodiments of the present disclosure and descriptions thereof are only for explaining the present disclosure, but do not constitute an undue limitation to the present disclosure. In the drawings.

DETAILED DESCRIPTION OF THE EMBODIMENTS

In order to further explain the array substrate and the manufacturing method thereof, the touch display panel and the touch display device as provided in embodiments of the present disclosure, a detailed description will be made below with reference to the accompanying drawings.

In the following description, reference signs as follows are used to refer to various components in the array substrate provided by embodiments of the present disclosure:

| | |
|---|---|
| 1-gate line, | 2-data line, |
| 10-base substrate, | 11-thin film transistor, |
| 111-active layer, | 112-gate insulating layer, |
| 113-gate, | 114-interlayer insulating layer, |
| 115-source, | 116-drain, |
| 12-insulating planarization layer, | 13-pixel electrode, |
| 14-first dielectric layer, | 15-touch electrode, |
| 16-second dielectric layer, | 17-common electrode. |

Figure 1:
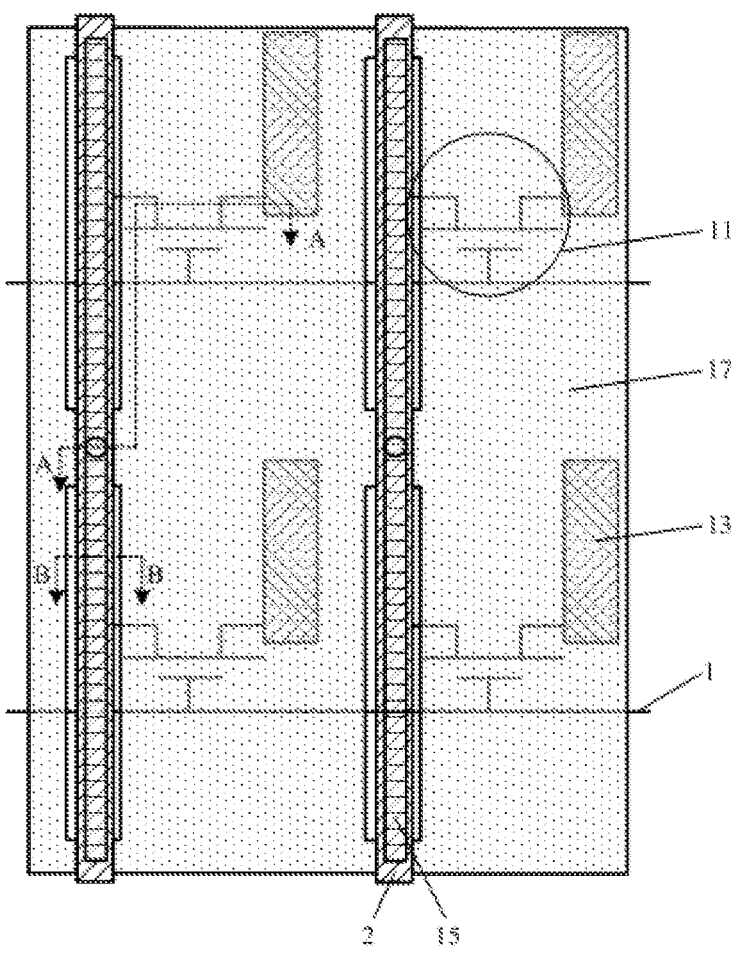
FIG. 1 schematically illustrates a top view of an array substrate according to an embodiment of the present disclosure.
Figure 2:
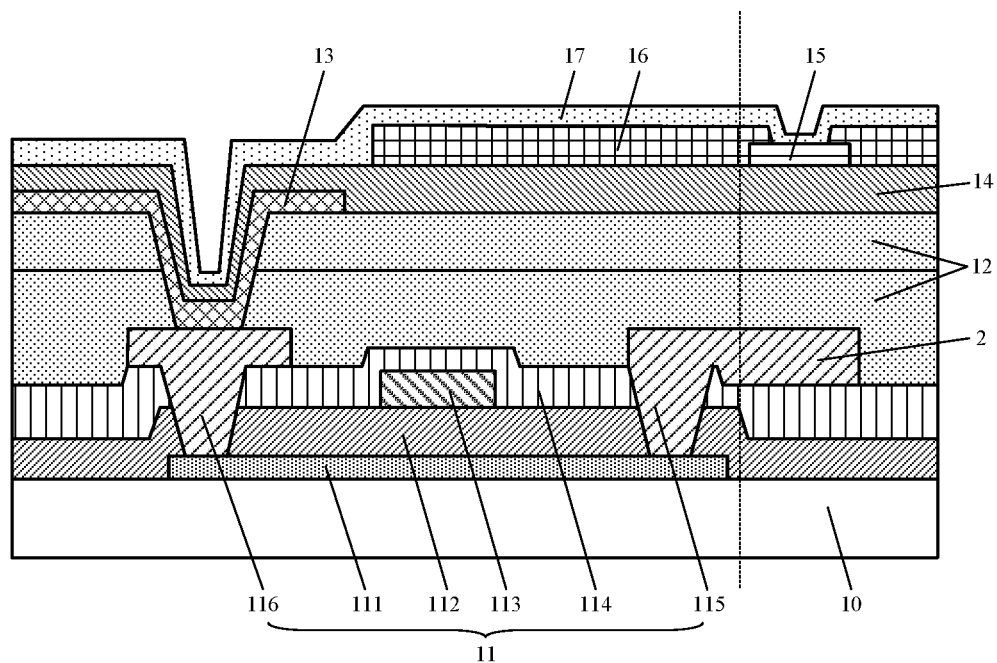
FIG. 2 schematically illustrates a side view taken along line A-A in FIG. 1.

Referring to FIG. 1 and FIG. 2, a top view and a side view of an array substrate according to an embodiment of the present disclosure are schematically illustrated. Specifically, the array substrate comprises: a base substrate; a plurality of thin film transistors 11 arranged in an array on the base substrate 10; an insulating planarization layer 12, the insulating planarization layer 12 being located at a side of the plurality of thin film transistors 11 away from the base substrate and having a plurality of vias exposing a drain 116 of each thin film transistor 11 respectively in the insulating planarization layer 12; a plurality of pixel electrodes 13, the plurality of pixel electrodes 13 being arranged in an array on a side of the insulating planarization layer 12 away from the plurality of thin film transistors 11, and each pixel electrode 13 is connected to a drain 116 of a corresponding thin film transistor 11 through a via in the insulating planarization layer 12; a plurality of touch electrodes 15, the plurality of touch electrodes 15 being arranged in an array on a side of the plurality of pixel electrodes 13 away from the insulating planarization layer 12; a plurality of common electrodes 17, the plurality of common electrodes 17 being arranged in an array on a side of the touch electrodes 15 away from the pixel electrodes 13, and each common electrode 17 being connected to a corresponding touch electrode 15.

By way of example, with continued reference to FIG. 1 and FIG. 2, an embodiment of the present disclosure provides an array substrate. The array substrate can be applied into a touch display panel to realize a display function and a touch function of the touch display panel. The array substrate comprises a base substrate 10, and thin film transistors 11, an insulating planarization layer 12, pixel electrodes 13, touch electrodes and common electrodes 17 which are formed sequentially on the base substrate 10. The number of the thin film transistors 11 is plural, and the plurality of thin film transistors 11 are arranged in an array on the base substrate 10. The insulating planarization layer 12 is located on the thin film transistors 11 and covers the thin film transistors 11. The pixel electrodes 13 are formed on the insulating planarization layer 12. Specifically, the pixel electrodes 13 are located on a side of the insulating planarization layer 12 away from the thin film transistors 11. The number of the pixel electrodes 13 is also plural, and the plurality of pixel electrodes 13 is arranged in an array. Each pixel electrode 13 is connected to a drain 116 of a corresponding thin film transistor 11 through a corresponding via in the insulating planarization layer 12. As for the material of pixel electrode 13, a transparent conductive material such as indium tin oxide (ITO) or indium gallium zinc oxide (IGZO) can be used. The touch electrodes 15 are located on a side of the pixel electrodes 13 away from the insulating planarization layer 12. That is, the touch electrodes 15 are located above the pixel electrodes 13. The common electrodes 17 are located on a side of the touch electrodes 15 away from the pixel electrodes 13. That is, the common electrodes 17 are located above the touch electrodes 15. Further, the common electrodes 17 are connected to corresponding touch electrodes 15. As for the material of common electrode 17, a transparent conductive material such as indium tin oxide (ITO) or indium gallium zinc oxide (IGZO) can be used.

When the array substrate provided by embodiments of the present disclosure is applied into a touch display panel, during operation of the touch display panel, for example, during the display phase, the thin film transistor 11 is turned on, and the thin film transistor 11 provides a pixel voltage signal to the pixel electrode 13. At the same time, the touch electrode 15 provides a common voltage signal to the corresponding common electrode 17. In such a case, a voltage difference is generated between the pixel electrode 13 and the common electrode 17, thereby realizing the display function of the touch display panel. Correspondingly, during the touch phase, the touch electrode 15 provides a touch voltage signal to the corresponding common electrode 17. For example, when the touch occurs, the voltage signal on the common electrode 17 will change, thereby realizing the touch function of the touch display panel.

It can be seen from above, in the array substrate provided by embodiments of the present disclosure, an insulating planarization layer 12 is disposed between the thin film transistors 11 and the pixel electrodes 13, the common electrodes 17 are disposed on a side of the touch electrodes 15 away from the pixel electrodes 13, and the touch electrodes 15 are located on a side of the pixel electrodes 13 away from the insulating planarization layer 12. That is, the common electrodes 17 are disposed on a side of the pixel electrodes 13 away from the insulating planarization layer 12, and the touch electrodes 15, the pixel electrodes 13 and the insulating planarization layer 12 are interposed between the common electrodes 17 and the thin film transistors 11. In this way, the distance between the common electrodes 17 and the thin film transistors 11 is made large. For example, the distance between the common electrode 17 and a source 115 of the thin film transistor 11 is large. Further, in the array substrate provided by embodiments of the present disclosure, the pixel electrodes 13 are located between the thin film transistors 11 and the common electrodes 17. In this case, when the array substrate provided by embodiments of the present disclosure is applied into the touch display panel, during operation of the touch display panel, the pixel electrode 13 can block the electricity generated between the common electrode 17 and each electrode of the thin film transistor 11. Therefore, when the array substrate provided by embodiments of the present disclosure is applied into the touch display panel, during operation of the touch display panel, for example, during display phase of the touch display panel, the capacitance between the common electrode 17 and the electrode (e.g., the source 115) of the thin film transistor 11 can be reduced. In this way, the voltage required to be supplied to the common electrode 17 during display of the touch display panel can be reduced, and the power consumption of the touch display panel during operation can be reduced. Meanwhile, in the array substrate provided by embodiments of the present disclosure, the pixel electrode 13 is formed on the insulating planarization layer 12, and the touch electrode 15 is prevented from being formed on the insulating planarization layer 12. Therefore, when forming the touch electrode 15 by a sputtering process, the insulating planarization layer 12 will not be decomposed due to a high temperature. Thus, the contamination to chamber can be avoided when forming the touch electrodes 15 by the sputtering process.

Further, in conventional solutions, the insulating planarization layer 12 on the thin film transistor 11 is generally made of an organic material. In such a case, in order to prevent decomposition of the organic material when forming the touch electrode 15 on the insulating planarization layer 12 by a sputtering process, a protective layer of inorganic material is generally formed after the insulating planarization layer 12 and vias in the insulating planarization layer 12 corresponding to drains 116. Specifically, vias corresponding to the drains 116 are also formed in the protective layer of inorganic material, and advantageously, diameters of the vias in the protective layer of inorganic material are smaller than diameters of the vias in the insulating planarization layer 12. In view of this, a dedicated mask is required to form the vias in the protective layer of inorganic material.

This causes the process for manufacturing the array substrate to be cumbersome and costly. In contrast, in embodiments of the present disclosure, the formation of touch electrodes 15 on the insulating planarization layer 12 of organic material is avoided. Thus, it is not necessary to provide a plurality of masks, thereby simplifying the process for manufacturing the array substrate and reducing the cost for manufacturing the array substrate.

Further, in embodiments of the present disclosure, the common electrodes 17 are disposed at the uppermost layer. As for the material of common electrode 17, a transparent conductive material such as Indium Tin Oxide (ITO) or Indium Gallium Zinc Oxide (IGZO) can be used. Therefore, there is no need to worry about the oxidation of common electrode 17, and it is not necessary to form a protective layer on the common electrode 17. In this way, the total thickness of array substrate can be reduced, thereby reducing the total thickness of touch display panel, and facilitating the thin and light design of touch display panel.

When the array substrate provided in the above embodiment is applied into the touch display panel, during operation of the touch display panel, for example, during the display phase, the thin film transistor 11 is turned on, and the thin film transistor 11 provides a pixel voltage signal to the pixel electrode 13. At the same time, the touch electrodes 15 provide a common voltage signal to the corresponding common electrode 17. In such a case, a voltage difference is generated between the pixel electrode 13 and the common electrode 17, thereby realizing the display function of the touch display panel. Similarly, during the touch phase, the touch electrode 15 provides a touch voltage signal to the common electrode 17, thereby realizing the touch function of the touch display panel. Therefore, during the display phase, the common electrode 17 and the pixel electrode 13 together realize the display function of the touch display panel; while during the touch phase, the common electrode 17 serves as a part of the touch sensing element, thereby realizing the touch function of the touch display panel. Therefore, in embodiments of the present disclosure, the number of the common electrodes 17 is also plural, and the coverage area of each common electrode 17 can be set according to actual needs. For example, it can be set according to the required touch resolution and the number of touch electrodes 15 that the touch driving chip can support.

In the above embodiment, the number of sub-layers and the total thickness of the insulating planarization layer 12 can be set according to actual needs. For example, the insulating planarization layer 12 may be a single layer structure. In this case, the thickness of the insulating planarization layer 12 can be set to be greater than or equal to 6 μm. In this way, the distance between the common electrode 17 and the thin film transistor 11 can be made large, thereby reducing the capacitance between the common electrode 17 and the electrode (e.g., the source 115) of the thin film transistor 11 during operation of the touch display panel (specifically, during the display phase). Therefore, the voltage required to be supplied to the common electrode 17 when the touch display panel is displaying can be reduced, thereby reducing the power consumption of the touch display panel during operation.

Alternatively, the insulating planarization layer 12 may also be a multilayer structure. For example, the insulating planarization layer 12 may include a plurality of sub-layers, for example, two, three or more sub-layers. In such a multilayer structure, the respective sub-layers of the insulating planarization layer 12 are stacked over each other and covering the thin film transistor 11. In this case, the total thickness of the plurality of sub-layers in the insulating planarization layer 12 may be set to be greater than or equal to 6 μm. As compared with the case where the insulating planarization layer 12 is a single layer structure, when the total thickness is set, the thickness of each sub-layer in the insulating planarization layers 12 having a multilayer structure is relatively small. In this way, difficulties in the process for forming the insulating planarization layer 12 can be reduced, and at the same time, it is also convenient to form vias in the insulating planarization layer 12. It should be noted that when the insulating planarization layer 12 includes a plurality of sub-layers, vias penetrating sub-layers are disposed at positions corresponding to the drains 116 of the thin film transistors 11 in each sub-layer, the vias expose the drains 116 of the thin film transistors 11, and corresponding vias in respective sub-layers of the insulating planarization layer 12 are in intercommunication with each other.

In the array substrate provided by embodiments of the present disclosure, an insulating planarization layer 12 is further disposed between the thin film transistor 11 and the pixel electrode 13, and the total thickness of the insulating planarization layer 12 is greater than or equal to 6 μm. Compared with the insulation between the thin film transistor 11 and the pixel electrode 13 by the insulating planarization layer 12 made of a layer of inorganic material in the conventional solution, in embodiments according to the present disclosure, the reliability of insulation between the thin film transistor 11 and the pixel electrode 13 can be increased, and the distance between the common electrode 17 and the thin film transistor 11 is also increased.

In the above embodiment, the insulating planarization layer 12 may include at least one sub-layer. In practical applications, the number of sub-layers in the insulating planarization layer 12 can be determined based on the actual needs of product, the manufacturing process capability, and the like. For example, the distance between the pixel electrode 13 and the thin film transistor 11 in the array substrate can be calculated based on the actual needs of product, and the distance can also be understood as the total thickness of the insulating planarization layer 12. Typically, the total thickness needs to be greater than or equal to 6 μm. After that, based on the calculated total thickness, the manufacturing process of the insulating planarization layer 12, and the process capability of the manufacturing process employed to manufacture the insulating planarization layer 12 (e.g., the maximum thickness of the film layer that can be formed by the manufacturing process), the number of sub-layers in the insulating planarization layer 12 is calculated.

With continued reference to FIG. 2, in an embodiment of the present disclosure, the number of sub-layers in the insulating planarization layer 12 may be two. In this case, compared with the insulating planarization layer 12 having a single layer structure, the total thickness of the insulating planarization layer 12 can be increased to some extent, so as to increase the distance between the thin film transistor 11 and the pixel electrode 13, increase the distance between the thin film transistor 11 and the common electrode 17, reduces the capacitance between the common electrode 17 and the electrode (e.g., the source 115) of the thin film transistor 11 when the touch display panel operates, and finally reduces the power consumption of the touch display panel during operation. Meanwhile, compared with the insulating planarization layer 12 having three or more sub-layers, this embodiment can satisfy the requirement for the total thickness of the insulating planarization layer 12, and reduce the process steps for manufacturing the array substrate as well.

When the number of sub-layers in the insulating planarization layer 12 is selected to be two, in an embodiment of the present disclosure, a thickness of a first sub-layer adjacent to the thin film transistor 11 is greater than or equal to 4 μm. This means that after manufacture of the thin film transistor 11 is completed, the thickness of the first sub-layer in the insulating planarization layer 12 as formed first is greater than or equal to 4 μm. In this way, the planarization effect of the first sub-layer of the insulating planarization layer 12 on other structures that have been formed on the base substrate 10 can be enhanced, which helps to facilitate the formation of subsequent sub-layers in the insulating planarization layer 12. Meanwhile, since the first sub-layer of the insulating planarization layer 12 (i.e., the sub-layer adjacent to the thin film transistor 11) functions mainly for planarization, and the drain 116 of the thin film transistor 11 is usually convex on the base substrate 10, the portion of the first sub-layer in the insulating planarization layer 12 corresponding to the drain 116 of the thin film transistor 11 will typically have a small thickness (generally less than the actual set thickness of the first sub-layer in the insulating planarization layer 12) and does not increase the difficulty for forming vias in the first sub-layer.

When the number of sub-layers in the insulating planarization layer 12 is selected to be two, in an embodiment of the present disclosure, the thickness of the second sub-layer in the insulating planarization layer 12 away from the thin film transistor 11 is 2 μm to 4 μm. This means that after formation of the thin film transistor 11 and the first sub-layer of the insulating planarization layer 12, the thickness of the second sub-layer in the insulating planarization layer 12 as formed subsequently may be 2 μm to 4 μm. After forming the first sub-layer of the insulating planarization layer 12, a surface of the first sub-layer of the insulating layer planarization layer away from the base substrate 10 is substantially planar. That is, as shown in FIG. 2, the upper surface of the first sub-layer of the insulating planarization layer is substantially planar. In view of this, the thickness of each sub-layer in the insulating planarization layer 12 as formed subsequently will be substantially the same in each region. As an example, the thickness of the second sub-layer in the insulating planarization layer 12 as formed subsequently is selected to be 2 μm to 4 μm. In this way, the total thickness of the insulating planarization layer 12 having a plurality of sub-layers can satisfy the above requirement, and it is also possible to prevent the thickness of each sub-layer in the insulating planarization layer 12 from being too large to increase the difficulty for forming vias in the sub-layer.

It is worth mentioning that when the insulating planarization layer 12 comprises a plurality of sub-layers, the following methods may be employed, in order to form a plurality of sub-layers of the insulating planarization layer 12 and vias penetrating the respective sub-layers. As a first implementation, firstly, a plurality of sub-layers of the insulating planarization layer 12 may be sequentially formed in a stack, and then a plurality of through holes penetrating through the sub-layers may be formed at one time by a patterning process, wherein each of the through holes exposes the drain 116 of a corresponding thin film transistor 11. Alternatively, as a second implementation, after each sub-layer of the insulating planarization layer 12 is formed, a patterning process is employed to form a plurality of vias in the sub-layer of the insulating planarization layer 12, wherein each of the vias corresponds in position to the drain 116 of a corresponding thin film transistor 11 and is in intercommunication with a corresponding via in the previous sub-layer. For example, assume that the number of sub-layers in the insulating planarization layer 12 is two. In such a case, when the second implementation is employed, the first sub-layer of the insulating planarization layer 12 may be formed first, with the first sub-layer covering the thin film transistor 11 and the base substrate 10; then, a plurality of vias corresponding to the drain 116 of each thin film transistor 11 respectively are formed in the first sub-layer of the insulating planarization layer 12, wherein each of the vias exposes the drain 116 of a corresponding thin film transistor 11; after that, a second sub-layer of the insulating planarization layer 12 is formed, with the second sub-layer located on the first sub-layer of the insulating planarization layer 12 and covering the first sub-layer; and finally, a plurality of vias corresponding to the drain 116 of each thin film transistor 11 respectively are formed in the second sub-layer of the insulating planarization layer 12, the vias in the second sub-layer of the insulating planarization layer 12 are in one-to-one correspondence and intercommunication with the vias in the first sub-layer of the insulating planarization layer 12, thereby exposing the drain 116 of each thin film transistor 11.

In the above embodiment, the material for forming the insulating planarization layer 12 can be selected according to actual needs. For example, the insulating layer planarization layer may be made of an organic material such as an acrylic material. The thickness of the insulating planarization layer 12 can be increased by selecting the material of the insulating planarization layer 12 as an organic material, compared with the insulating planarization layer 12 made of an inorganic material. Meanwhile, in the process for forming the vias, only exposure and development are required, and etching and removing of photoresist are not required. Thus, the process steps for manufacturing the array substrate can be reduced.

Figure 3:
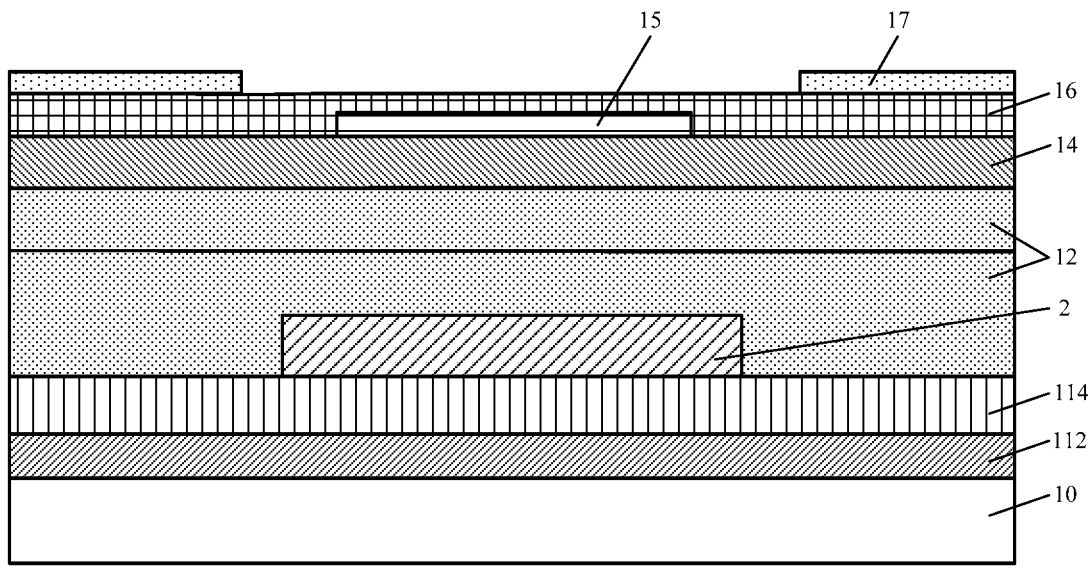
FIG. 3 schematically illustrates a side view taken along line B-B in FIG. 1.

With continued reference to FIG. 1, FIG. 2 and FIG. 3, the array substrate provided by embodiments of the present disclosure further comprises a plurality of data lines 2 on the base substrate 10, wherein the source 115 of each thin film transistor 11 is connected to a corresponding data line 2. Furthermore, an orthographic projection of each touch electrode 15 on the base substrate 10 at least partially overlaps with an orthographic projection of a corresponding data line 2 on the base substrate 10. This means that the orthographic projection of each touch electrode 15 on the base substrate 10 can completely coincide with the orthographic projection of the corresponding data line 2 on the base substrate 10. Alternatively, the orthographic projection of each touch electrode 15 on the base substrate 10 may also fall within the orthographic projection of the corresponding data line 2 on the base substrate 10. Further alternatively, the orthographic projection of each touch electrode 15 on the base substrate 10 may also cover the orthographic projection of the corresponding data line 2 on the base substrate 10, and advantageously, in a direction perpendicular to the data line 2, the orthographic projection of each touch electrode 15 on the base substrate 10 may be slightly larger than the orthographic projection of the corresponding data line 2 on the base substrate 10. Therefore, in embodiments of the present disclosure, each touch electrode 15 will be formed directly above the data line 2, so that the touch electrode 15 will never cover the pixel display area and will not have an adverse effect on the aperture ratio of the touch display panel.

With continued reference to FIG. 1 and FIG. 3, in embodiments of the present disclosure, each common electrode 17 comprises a first portion (e.g., a portion directly above the touch electrode 15 in the figure) and a second portion (e.g., a portion other than the first portion in the figure), wherein the common electrode 17 is connected to the corresponding touch electrode 15 through the first portion. Further, in the array substrate provided by embodiments of the present disclosure, for each common electrode 17, an orthographic projection of the first portion on the base substrate 10 at least partially overlap with an orthographic projection of a corresponding touch electrode 15 on the base substrate 10, and an orthographic projection of the second portion on the base substrate 10 does not overlap with the orthographic projection of a corresponding touch electrode 15 on the base substrate 10. That is, except for the portion where the common electrode 17 is connected to the corresponding touch electrode 15, the orthographic projections of other portions of the common electrode 17 on the base substrate 10 do not overlap with the orthographic projection of the touch electrode 15 on the base substrate 10. This means that in the common electrode 17, except for the portion connected to the corresponding touch electrode 15, no other portion overlaps with the corresponding touch electrode 15 on the base substrate. Therefore, the facing area between the common electrode 17 and the data line 2 can be reduced, so that the capacitance between the common electrode 17 and the data line 2 can be reduced during display of the touch display panel, and thus the power consumption of the touch display panel can be reduced during operation.

In the above embodiment, the type of the thin film transistor 11 can be set according to actual needs. For example, the type of the thin film transistor 11 can be selected based on the material of the active layer 111. For example, the thin film transistor 11 may be an amorphous silicon thin film transistor, a single crystal silicon thin film transistor, a polysilicon thin film transistor, a metal oxide thin film transistor, or the like. Further or alternatively, the thin film transistor 11 can be selected based on its structure. For example, the thin film transistor 11 may be a top gate thin film transistor or a bottom gate thin film transistor. In embodiments of the present disclosure, when the material of the active layer 111 in the thin film transistor 11 is selected as low temperature polysilicon, the structure may be selected to be a top gate type. That is, the thin film transistor 11 in embodiments of the present disclosure is a top gate, low temperature polysilicon, thin film transistor. Specifically, referring to FIG. 2, in embodiment of the present disclosure, the thin film transistor 11 comprises an active layer 111, a gate insulating layer 112, a gate 113, an interlayer insulating layer 114, a source 115, and a drain 116. Specifically, the active layer 111 is formed on the base substrate 10, and the material of the active layer 111 is low temperature polysilicon. Further, the gate insulating layer 112 covers the active layer 111 and the base substrate 10, and the gate 113 is formed at a position on the gate insulating layer 112 corresponding to the active layer 111. A gate line 1 is also disposed in the same layer as the gate 113, and the gate 113 is connected to the corresponding gate line 1. Further, the interlayer insulating layer 114 covers the gate 113, the gate line 1 and the gate insulating layer 112, and the source 115 and the drain 116 are formed on the interlayer insulating layer 114, wherein the orthographic projection of the source 115 on the base substrate 10 and the orthographic projection of the drain 116 on the base substrate 10 are respectively located at both sides of the orthographic projection of the gate 113 on the base substrate 10 (in a direction parallel to the gate line 1). The source 115 and the drain 116 are connected to the active layer 111 through vias penetrating the interlayer insulating layer 114 and the gate insulating layer 112, respectively. The data line 2 is also disposed in the same layer as the source 115 and the drain 116, and the source 115 is connected to the corresponding data line 2, wherein the data line 2 and the gate line 1 intersect each other perpendicularly, thereby defining pixel areas.

With continued reference to FIG. 2 and FIG. 3, in embodiments of the present disclosure, a first dielectric layer 14 may be disposed between the pixel electrodes 13 and the touch electrodes 15 to insulate the pixel electrodes 13 from the touch electrodes 15. As for the material of the first dielectric layer 14, an inorganic material such as silicon oxide (SiOx), silicon nitride (SiNx) or silicon oxynitride (SiNO) may be selected. In such a case, decomposition of the first dielectric layer 14 caused by the subsequent formation of metal touch electrode 15 by a sputtering process can be prevented, thereby avoiding pollutions to the sputtering chamber when the metal touch electrode 15 is formed by the sputtering process.

With continued reference to FIG. 2 and FIG. 3, in embodiments of the present disclosure, a second dielectric layer 16 may be disposed between the touch electrodes 15 and the common electrodes 17, so that the touch electrodes 15 are kept insulated from the common electrodes 17, except for the connected portion. As an example, the second dielectric layer 16 may be made of an organic material or an inorganic material.

It should be noted that, in embodiments of the present disclosure, an orthographic projection of the second dielectric layer 16 on the base substrate 10 does not overlap with the orthographic projection of the pixel electrode 13 on the base substrate 10, except for the portion corresponding to the touch electrode 15. In this way, only the first dielectric layer 14 exists between the common electrode 17 and the pixel electrode 13, thereby reducing the distance between the common electrode 17 and the pixel electrode 13, increasing the capacitance between the pixel electrode 13 and the common electrode 17 during display of the touch display panel, and ultimately improving the display effect of the touch display panel.

Embodiments of the present disclosure further provide a touch display panel comprising the array substrate as described in any of the above embodiments.

The touch display panel has the same or similar advantages as the above array substrate, and details are not described herein again.

Embodiments of the present disclosure further provide a touch display device comprising the touch display panel as described in any of the above embodiments.

Figure 4:
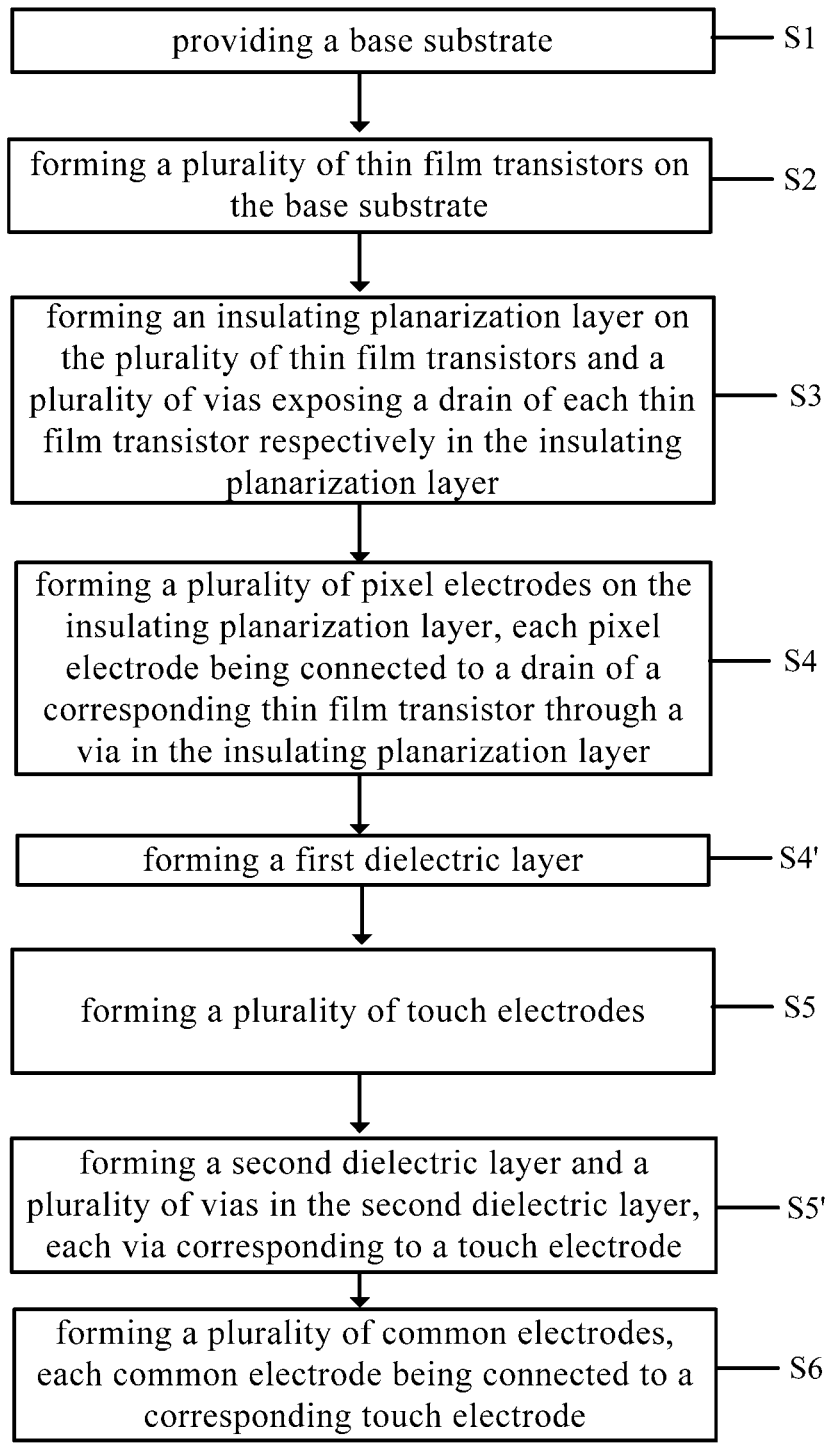
FIG. 4 schematically illustrates a flow chart of a manufacturing method for an array substrate according to an embodiment of the present disclosure.

Referring to FIG. 4, a flow chart of a manufacturing method for an array substrate according to an embodiment of the present disclosure is schematically illustrated. Such a manufacturing method can be used to manufacture the array substrate as described in any of the above embodiments. Specifically, the manufacturing method of the array substrate comprises the following steps.

Step S1, providing a base substrate.

Step S2, forming a plurality of thin film transistors in an array on the base substrate.

Step S3, forming an insulating planarization layer on a side of the plurality of thin film transistors away from the base substrate and forming a plurality of vias exposing a drain of each thin film transistor respectively in the insulating planarization layer.

Step S4, forming a plurality of pixel electrodes in an array on a side of the insulating planarization layer away from the plurality of thin film transistors, each pixel electrode being connected to a drain of a corresponding thin film transistor through a via in the insulating planarization layer.

Step S5, forming a plurality of touch electrodes in an array at a side of the plurality of pixel electrodes away from the insulating planarization layer.

Step S6, forming a plurality of common electrodes in an array on a side of the plurality of touch electrodes away from the plurality of pixel electrodes, each common electrode being connected to a corresponding touch electrode.

The manufacturing method for the array substrate has the same or similar advantages as the above array substrate, and details are not described herein again.

Figure 5:
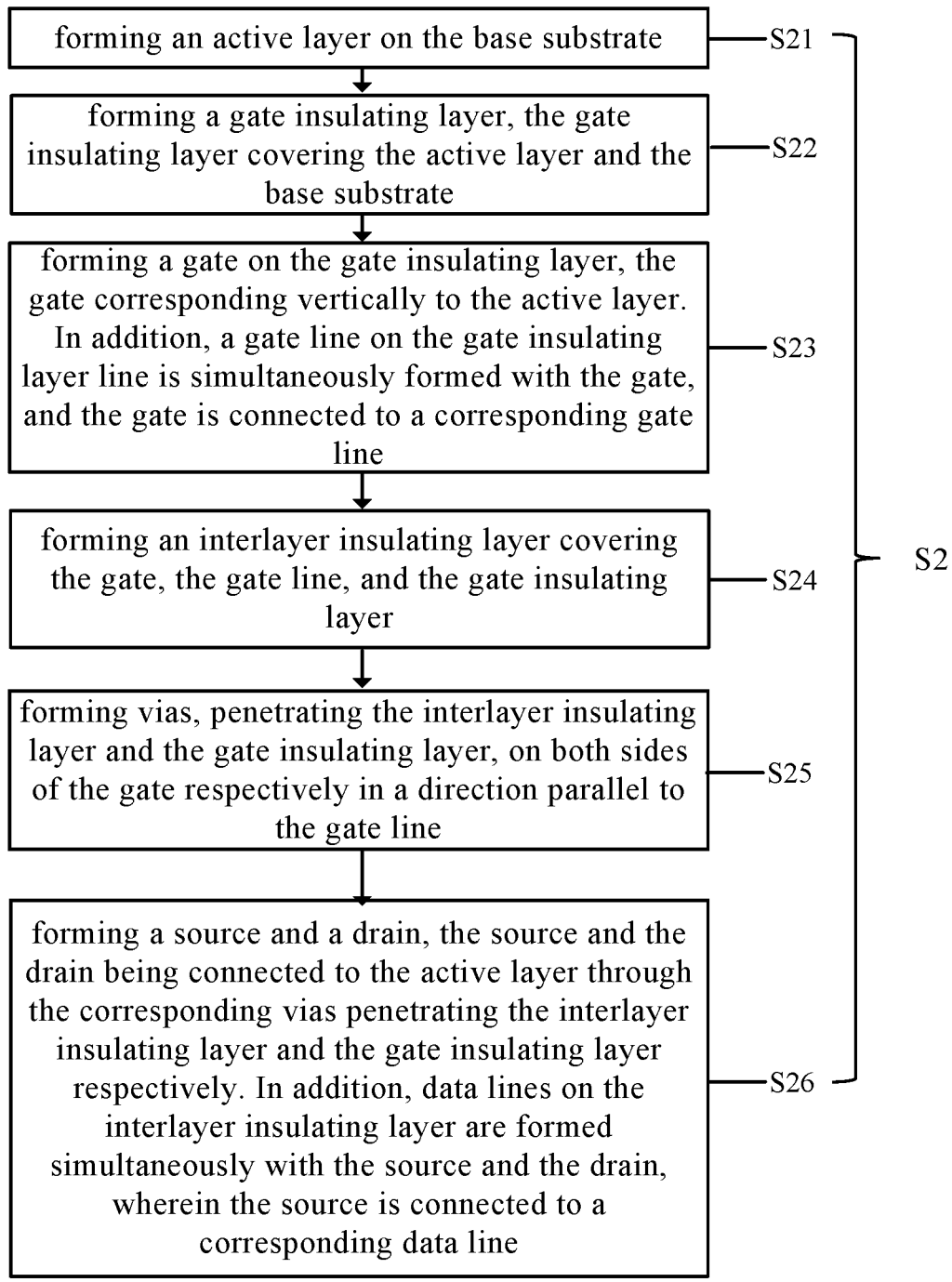
FIG. 5 schematically illustrates a flow chart of step S2 in FIG. 4.

Further, referring to FIG. 5, in step S2, the step of forming the plurality of thin film transistors in an array on the base substrate may comprise the following sub-steps.

Step S21, forming an active layer on the base substrate.

Step S22, forming a gate insulating layer, the gate insulating layer covering the active layer and the base substrate.

Step S23, forming a gate on the gate insulating layer, the gate corresponding vertically to the active layer. In addition, a gate line on the gate insulating layer line is formed simultaneously with the gate, and the gate is connected to a corresponding gate line.

Step S24, forming an interlayer insulating layer covering the gate, the gate line, and the gate insulating layer.

Step S25, forming vias penetrating the interlayer insulating layer and the gate insulating layer on both sides of the gate respectively in a direction parallel to the gate line.

Step S26, forming a source and a drain, the source and the drain being connected to the active layer through corresponding vias penetrating the interlayer insulating layer and the gate insulating layer respectively. In addition, data lines on the interlayer insulating layer are formed simultaneously with the source and the drain, and the source is connected to a corresponding data line.

Figure 6:
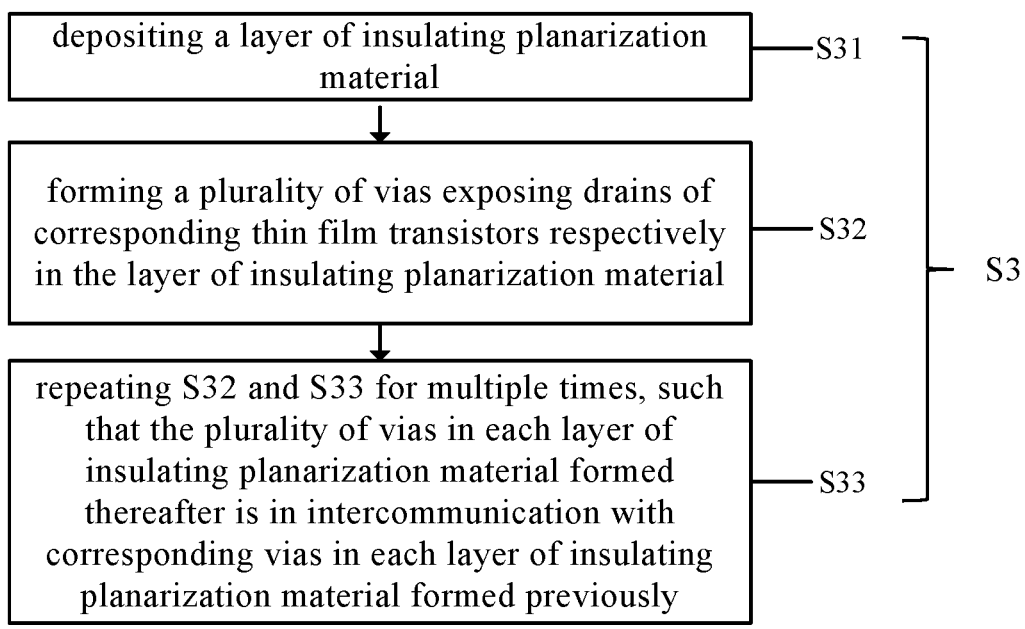
FIG. 6 schematically illustrates a flow chart of step S3 in FIG. 4.

Referring to FIG. 6, in a specific example of the above embodiment, when the insulating planarization layer includes a plurality of sub-layers, the step S3 of forming the insulating planarization layer and the plurality of vias in the insulating planarization layer may comprise the following sub-steps.

Step S31, depositing a layer of insulating planarization material on a side of the plurality of thin film transistors away from the base substrate.

Step S32, forming a plurality of vias exposing drains of the corresponding thin film transistors respectively in the layer of insulating planarization material.

Step S33, repeating the above steps S32 and S33, such that the plurality of vias in each layer of insulating planarization material formed thereafter is in intercommunication with the corresponding vias in each layer of insulating planarization material formed previously.

With continued reference to FIG. 4, the manufacturing method for an array substrate provided by an embodiment of the present disclosure may further comprise: step S4' after step S4 and before step S5, that is, forming a first dielectric layer on a side of the plurality of pixel electrodes away from the insulating planarization layer. Alternatively, in other embodiments, the manufacturing method for an array substrate may further comprise: step S5' after step S5 and before step S6, that is, forming a second dielectric layer on a side of the plurality of touch electrodes away from the plurality of the pixel electrode, and forming a plurality of vias in the second dielectric layer such that each touch electrode is connected to the corresponding common electrode through a via.

In the above description of implementations, specific features, structures, materials, or characteristics may be combined in any suitable manner in any one or more embodiments or examples.

The above embodiments are only used for explanations rather than limitations to the present disclosure. The ordinary skilled person in the related technical field, in the case of not departing from the spirit and scope of the present disclosure, may also make various modifications and variations. Therefore, all the equivalent solutions also belong to the scope of the present disclosure, and the protection scope of the present disclosure should be defined by the claims.

The invention claimed is:

1. An array substrate, comprising:
 a base substrate;
 a plurality of thin film transistors in an array on the base substrate;
 an insulating planarization layer, wherein the insulating planarization layer is at a side of the plurality of thin film transistors away from the base substrate and has a plurality of vias exposing respective drains of respective ones of the thin film transistors;
 a plurality of pixel electrodes in an array on a side of the insulating planarization layer away from the plurality of thin film transistors, wherein ones of the plurality of pixel electrodes are connected to the respective drains of corresponding ones of the plurality of thin film transistors through respective ones of the plurality of vias in the insulating planarization layer;
 a plurality of touch electrodes in an array on a side of the plurality of pixel electrodes away from the insulating planarization layer;
 a plurality of common electrodes in an array on a side of the plurality of touch electrodes away from the plurality of pixel electrodes, wherein ones of the plurality of common electrodes are connected to corresponding ones of the plurality of touch electrodes;
 a first dielectric layer between the plurality of pixel electrodes and the plurality of touch electrodes; and
 a second dielectric layer between the plurality of touch electrodes and the plurality of common electrodes,
 wherein the orthographic projection of the entire width of the second dielectric layer on the base substrate does not overlap with the orthographic projections of the entire width of each of the plurality of pixel electrodes on the base substrate.

2. The array substrate according to claim 1, wherein the insulating planarization layer comprises a single layer having a thickness greater than or equal to 6 μm.

3. The array substrate according to claim 1,
 wherein the insulating planarization layer comprises a plurality of sub-layers, and
 wherein a total thickness of the plurality of sub-layers is greater than or equal to 6 μm.

4. The array substrate according to claim 3,
 wherein the insulating planarization layer comprises a first sub-layer of the plurality of sub-layers adjacent to the plurality of thin film transistors and a second sub-layer of the plurality of sub-layers away from the plurality of thin film transistors,
 wherein a thickness of the first sub-layer is greater than or equal to 4 μm, and
 wherein a thickness of the second sub-layer is between 2 μm and 4 μm.

5. The array substrate according to claim 1, wherein the insulating planarization layer comprises an acrylic material.

6. The array substrate according to claim 1, further comprising:
- a plurality of data lines on the base substrate,
- wherein respective sources of ones of the plurality of thin film transistors are connected to corresponding ones of the plurality of data lines, and
- wherein an orthographic projection of each of the plurality of touch electrodes on the base substrate at least partially overlaps with an orthographic projection of a corresponding one of the plurality of data lines on the base substrate.

7. The array substrate according to claim 1,
- wherein each of the plurality of common electrodes comprises a first portion and a second portion,
- wherein an orthographic projection of the first portion on the base substrate at least partially overlaps with an orthographic projection of a corresponding one of the plurality of touch electrodes on the base substrate,
- wherein an orthographic projection of the second portion on the base substrate does not overlap with the orthographic projection of the corresponding one of the plurality of touch electrodes on the base substrate, and
- wherein each of the plurality of common electrodes is connected to a corresponding one of the touch electrodes through the first portion.

8. The array substrate according to claim 1,
- wherein the first dielectric layer comprises an inorganic material, and
- wherein the second dielectric layer comprises an organic material or an inorganic material.

9. The array substrate according to claim 1,
- wherein each of the plurality of thin film transistors comprises a low temperature polysilicon thin film transistor.

10. A touch display panel, comprising the array substrate according to claim 1.

11. A touch display device, comprising the touch display panel of claim 10.

12. A manufacturing method for an array substrate, comprising:
- providing a base substrate;
- forming a plurality of thin film transistors in an array on the base substrate;
- forming an insulating planarization layer on a side of the plurality of thin film transistors away from the base substrate and forming a plurality of vias exposing respective drains of respective ones of the plurality of thin film transistors in the insulating planarization layer;
- forming a plurality of pixel electrodes in an array on a side of the insulating planarization layer away from the plurality of thin film transistors, wherein ones of the plurality of pixel electrodes are connected to the respective drains of corresponding ones of the plurality of thin film transistors through respective ones of the plurality of vias in the insulating planarization layer;
- forming a first dielectric layer on a side of the plurality of pixel electrode away from the insulating planarization layer;
- forming a plurality of touch electrodes in an array on a side of the first dielectric layer away from the insulating planarization layer;
- forming a second dielectric layer on a side of the plurality of touch electrodes away from the plurality of pixel electrodes, wherein the orthographic projection of the entire width of the second dielectric layer on the base substrate does not overlap with the orthographic projections of the entire width of each of the plurality of pixel electrodes on the base substrate; and
- forming a plurality of common electrodes in an array on a side of the second dielectric layer away from the plurality of pixel electrodes, wherein ones of the plurality of common electrodes are connected to corresponding ones of the plurality of touch electrodes.

13. The manufacturing method for an array substrate according to claim 12, wherein the forming the insulating planarization layer on the side of the plurality of thin film transistors away from the base substrate and the forming the plurality of vias in the insulating planarization layer comprises:
- depositing a layer of insulating planarization material on the side of the plurality of thin film transistors away from the base substrate;
- forming the plurality of vias in the layer of insulating planarization material; and
- repeating the depositing the layer of insulating planarization material and the forming the plurality of vias, such that an additional plurality of vias in each additional layer of insulating planarization material formed thereafter is in intercommunication with corresponding vias in each layer of insulating planarization material formed previously.

14. The manufacturing method for an array substrate according to claim 12,
- wherein the forming a second dielectric layer on a side of the plurality of touch electrodes away from the plurality of pixel electrodes comprises forming a plurality of vias in the second dielectric layer, such that each via of the plurality of vias corresponds to one touch electrode of the plurality of touch electrodes.

15. The array substrate according to claim 2, wherein the insulating planarization layer comprises an acrylic material.

16. The array substrate according to claim 2, further comprising:
- a plurality of data lines on the base substrate,
- wherein respective sources of ones of the plurality of thin film transistors are connected to corresponding ones of the plurality of data lines, and
- wherein an orthographic projection of each of the plurality of touch electrodes on the base substrate at least partially overlaps with an orthographic projection of a corresponding one of the plurality of data lines on the base substrate.

17. The array substrate according to claim 2,
- wherein each of the plurality of common electrodes comprises a first portion and a second portion,
- wherein an orthographic projection of the first portion on the base substrate at least partially overlaps with an orthographic projection of a corresponding one of the plurality of touch electrodes on the base substrate,
- wherein an orthographic projection of the second portion on the base substrate does not overlap with the orthographic projection of the corresponding one of the plurality of touch electrodes on the base substrate, and
- wherein each of the plurality of common electrodes is connected to a corresponding one of the touch electrodes through the first portion.

18. The array substrate according to claim 2,
- wherein each of the plurality of thin film transistors comprises a low temperature polysilicon thin film transistor.

* * * * *